United States Patent
Savia

(10) Patent No.: US 6,174,272 B1
(45) Date of Patent: Jan. 16, 2001

(54) ROLL HAVING FRAME BEAM AND GLIDE SHOE FOR EQUALIZING LOADING PRESSURE

(75) Inventor: Risto Savia, Kotka (FI)

(73) Assignee: Valmet Corporation (FI)

( * ) Notice: Under 35 U.S.C. 154(b), the term of this patent shall be extended for 0 days.

(21) Appl. No.: 09/180,849

(22) PCT Filed: Mar. 12, 1998

(86) PCT No.: PCT/FI98/00218

§ 371 Date: Nov. 17, 1998

§ 102(e) Date: Nov. 17, 1998

(87) PCT Pub. No.: WO98/42992

PCT Pub. Date: Oct. 1, 1998

(30) Foreign Application Priority Data

Mar. 20, 1997 (FI) .................................................. 971164

(51) Int. Cl.⁷ .................................................. B23P 15/00
(52) U.S. Cl. .................................. 492/7; 492/16; 492/20
(58) Field of Search .................................. 492/7, 16, 20

(56) References Cited

U.S. PATENT DOCUMENTS

| | | | |
|---|---|---|---|
| 3,543,366 | 12/1970 | Collet | 29/113 |
| 3,853,698 | 12/1974 | Mohr | 162/358 |
| 4,455,727 | 6/1984 | Tschirner | 29/113 R |
| 4,685,183 | * 8/1987 | Justus | 492/7 |
| 4,747,195 | * 5/1988 | Snellman | 492/7 |
| 4,805,279 | * 2/1989 | Pav | 492/7 |
| 5,081,759 | 1/1992 | Schiel | 29/116.1 |
| 5,329,847 | * 7/1994 | Schiel | 492/7 |
| 5,484,370 | * 10/1999 | Jenke et al. | 492/7 |
| 5,967,957 | * 10/1999 | Kusters | 492/7 |

FOREIGN PATENT DOCUMENTS

| | | | |
|---|---|---|---|
| 600037 | 6/1978 | (CH) | D21G/1/02 |
| 891793 | 4/1989 | (FI) | F16C/13/00 |

* cited by examiner

*Primary Examiner*—I Cuda
(74) *Attorney, Agent, or Firm*—Steinberg & Raskin, P.C.

(57) ABSTRACT

A roll, in particular a variable-crown roll, including a frame beam, an axle journal arranged at each end of the frame beam and a revolving roll mantle mounted by bearings on support of the axle journals. A glide shoe is arranged on the frame beam to act on the roll mantle in order to produce a loading pressure in a nip defined between the roll and a back-up roll. A hose filled with fluid is situated between the glide shoe and the frame beam in order to equalize the loading pressure transferred through the glide shoe in the longitudinal direction of the roll.

8 Claims, 2 Drawing Sheets

ROLL HAVING FRAME BEAM AND GLIDE SHOE FOR EQUALIZING LOADING PRESSURE

FIELD OF THE INVENTION

The invention concerns a roll, comprising a frame beam, at each of whose ends there are axle journals, the revolving roll mantle being mounted by means of bearings on support of said axle journals, in which roll a glide shoe has been provided in connection with the frame beam in order to produce a loading pressure in the nip between the roll and its backup roll.

BACKGROUND OF THE INVENTION

From the prior art, a number of different variable-crown rolls are known, which are in many cases provided with a possibility of profiling in the longitudinal direction of the roll. In certain applications, such a possibility of profiling is unnecessary, in which case a roll provided with a profiling arrangement is a complicated and expensive solution.

In respect of the prior art, U.S. Pat. No. 3,853,698 can be referred to, from which patent a large hydraulic press roll is known. In accordance with an embodiment described in said publication (FIG. 4), the roll arrangement is composed of a piston and of a pressurized duct as well as of an articulated shoe, in which way a possibility of inclining the shoe is provided. This arrangement is quite complicated and requires pressurizing devices for the duct, regulation arrangements, etc., which makes an arrangement in accordance with said application expensive.

OBJECTS AND SUMMARY OF THE INVENTION

It is an object of the present invention to provide a roll, which has simple construction and is therefore advantageous, for a number of different applications in which a possibility for profiling of the nip pressure in the longitudinal direction of the roll is not required.

It is an object of the invention to provide a roll by whose means occurrence of bending in the longitudinal direction of the nip is compensated for.

In view of achieving the objectives stated above and those that will come out later, the roll in accordance with the invention is mainly characterized in that a hose filled with fluid has been fitted between the glide shoe and the frame beam in order to equalize the loading pressure transferred through the glide shoe in the longitudinal direction of the roll.

In a particular embodiment of the invention, the roll is a variable-crown roll.

In accordance with the basic idea of the invention, the bending is compensated for by means of a hose or equivalent filled with fluid so that the fluid pressure produced by the loading force, which fluid pressure is uniform over the entire length of the roll, produces a uniform nip pressure likewise over the entire length of the roll. In the arrangement in accordance with the invention, the roll consists of a thin mantle and of a frame beam fitted inside the mantle, onto which frame beam a fluid-filled hose of preferably flat shape has been fitted, onto which hose a glide shoe that operates as a bearing face has been fitted. In the loaded state, when the frame beam bends, the force that supports the glide shoe remains substantially invariable in the cross direction of the machine, because the pressure in the interior of the hose is invariable across the entire area. In the arrangement in accordance with the invention, the support force produced by the pressure in the hose becomes, in a loading situation, equal to the effective loading force.

In accordance with an embodiment of the invention, the possible error that is produced by flattening of the hose at the roll ends and by bulging of the hose in the middle area has been eliminated by shaping the hose so that the effective width of the hose remains invariable irrespective of bending of the frame.

In accordance with an embodiment of the invention, variation in the effective width of the hose can also be reduced by fitting two or more hoses one above the other, and in view of possible situations of oblique loading the hose can be divided into two parts in the middle in the cross direction of the machine, whereby "floating" of the glide shoe on support of the fluid pressure is maintained over the entire length in the longitudinal direction in spite of an oblique load, which might otherwise cause gathering of the fluid in one end of the hose while the other end is emptied of fluid.

A possible variation in the effective width of the hose can also be compensated for by making the frame beam appropriately curved.

The arrangement in accordance with the invention is of simple construction and, therefore, advantageous to carry into effect. Also, the invention permits making of the roll mantle quite thin, because the mantle is not subjected to a significant strain since the glide shoe, the hose and the frame beam receive the loads.

In an arrangement in accordance with the invention, the lubrication of the glide shoe can be made hydrodynamic or hydrostatic, as required. The mantle of the roll is journalled from its ends by means of guiding bearings, which permit a slight movement in the direction of the loading force as a result of bending and of compression of the hose. However, it should be noticed that significant forces are not applied to the bearings, because the roll mantle rests on support of the glide shoe over its entire loaded length.

In the arrangement in accordance with the invention, the pressure in the hose that is used is set in compliance with the area of the hose and with the loading situation so that the support force is equal to the loading force, in which case, in a situation with no load, the pressure in the hose is very close to zero.

Since, in the arrangement in accordance with the invention, the loading pressure is applied to the shoe and is transferred through the hose to the frame beam, flattening of the diameter of the roll mantle in the loading direction, which occurs in prior-art applications, does not occur in the present arrangement.

A roll in accordance with the invention, in particular a variable-crown roll, is suitable for use in a number of different applications in paper and/or board machines and in their finishing machines, for example, as a roll in press nips in which no rolls that can be profiled are needed, as a backup roll for a shoe press, as a roll in an extended-nip press in situations in which the backup roll must be profiled, as an upper and/or lower roll in calenders with one or several nips, etc.

In an arrangement in accordance with the invention, in connection with the roll, if desired, it is possible to fit arrangements by whose means the pressure present in the hose is regulated depending on the loading situation, in which case the ends of the roll mantle are journalled so that the movement in the direction of the loading force, mentioned above, is prevented and the curve form of the roll can be set.

In accordance with the invention, the curve form of the roll can be regulated by setting the pressure inside the hose. In such a case, the journalling of the roll must be fixed, i.e. the movement in the direction of the loading force be prevented. By setting the pressure in the hose, it is also possible to close and to open the nip between the variable-crown roll and its backup roll by means of a system fitted in the interior of the roll. In such a case, the journalling of the variable-crown roll must, however, be floating, i.e. it permits a movement of the necessary extent in the loading direction, and the backup roll must be provided with fixed journalling. Regulation of the curve form, i.e. of the nip pressure profile, and so also closing and opening of the nip, require that an outside source of pressure with a regulation system is arranged in connection with the hose of the roll. When the movements of closing and opening the nip are carried out in this way, loading means fitted outside the roll are not needed at all, which means considerable economies. In some applications, a second glide shoe and a second hose are needed in the roll for opening of the nip if the roll has to be raised in order to open the nip.

BRIEF DESCRIPTION OF THE DRAWINGS

In the following, the invention will be described in more detail with reference to the figures in the accompanying drawing, the invention being, however, not supposed to be strictly confined to the details of said illustrations.

DETAILED DESCRIPTION OF THE PREFERRED EMBODIMENT

Figure 1:
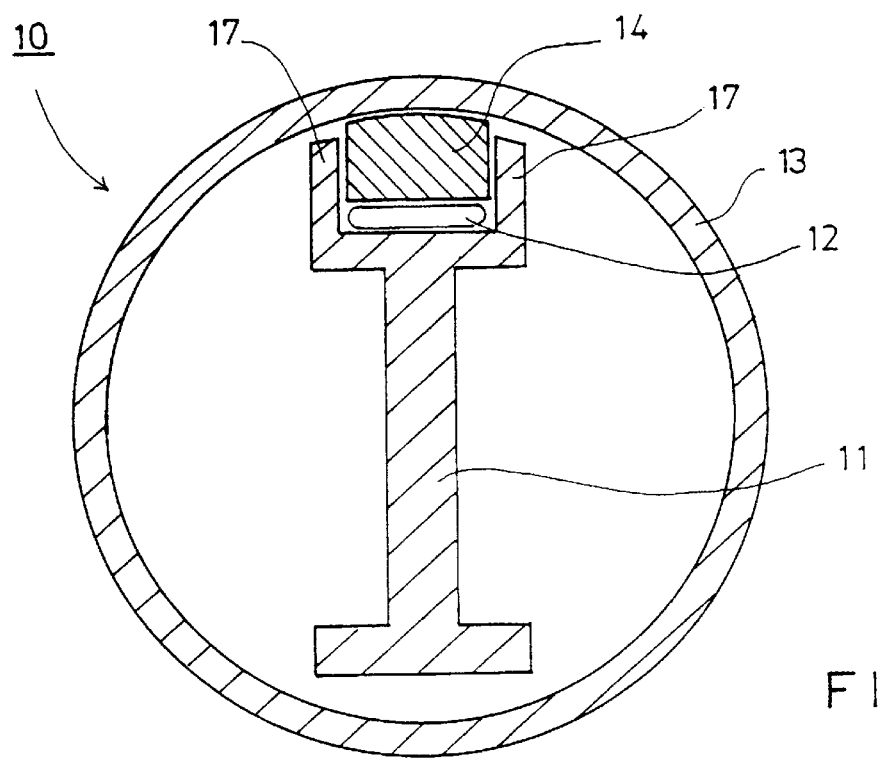
FIG. 1 is a schematic sectional view of a variable-crown roll in accordance with one embodiment of the invention.
Figure 2:
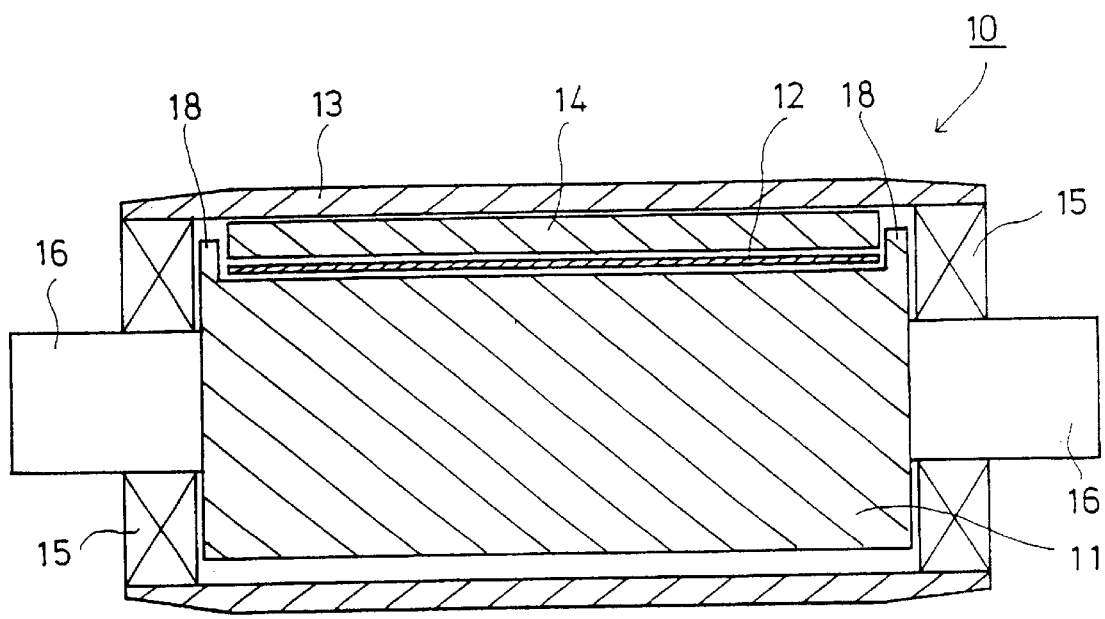
FIG. 2 is a schematic longitudinal sectional view of the exemplifying embodiment of the invention shown in FIG. 1.

As is shown in FIGS. 1 and 2, the roll 10 comprises a frame beam 11, which is, for example, of the I-section beam type. At the ends of the frame beam 11, there are axle journals 16, on which the revolving roll mantle 13 is supported by means of bearings 15. On the frame beam 11, in the direction of loading, a fluid-filled hose 12 is placed, on which a glide shoe 14 is fitted. In a loading situation, the roll mantle 13 is pressed against the glide shoe 14, in which connection the loading force is transferred to the hose 12, in which the pressure is formed so that it corresponds to the loading force, whereby a uniform linear pressure is produced. The glide shoe 14 and the hose 12 are placed preferably on the I-section beam in a U-section recess, whose side walls 17 prevent shifting of the hose 12 and of the glide shoe 14 towards the sides. In the longitudinal direction of the roll 10, the hose 12 extends over the entire length of the glide shoe 14, i.e. substantially over the length of the roll 10. Onto the frame beam 11, a U-section recess has also been formed in the longitudinal direction, and the end walls 18 of said recess prevent shifting of the glide shoe 14 and of the hose 12 in the longitudinal direction of the roll.

Figure 3:
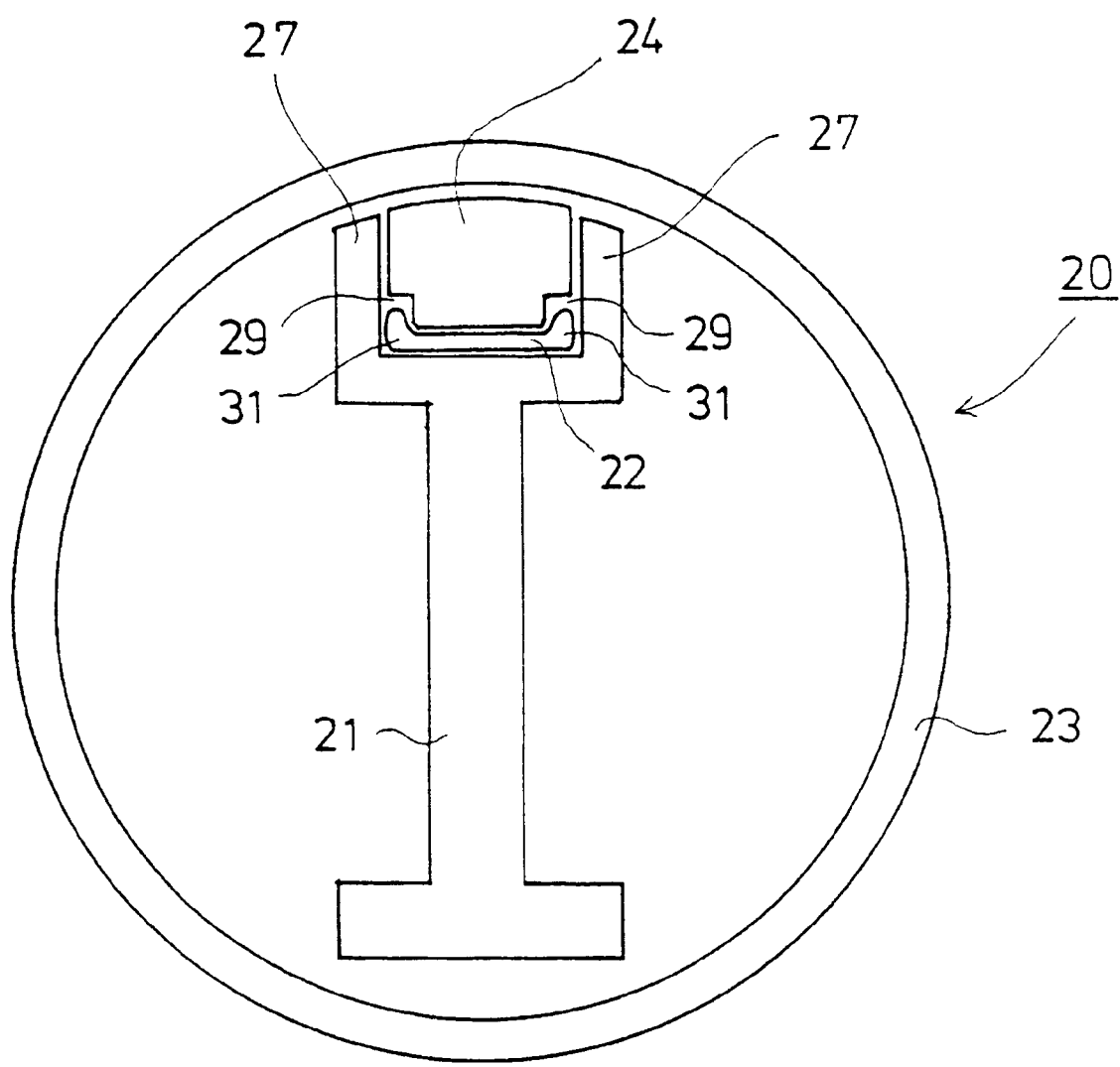
FIG. 3 is a schematic sectional view of a second embodiment of a variable-crown roll in accordance with the invention.

In the exemplifying embodiment of the invention shown in FIG. 3, on the frame beam 21, in the U-section recess inside the side walls 27 and the end walls (not shown in the figure), a fluid-filled hose 22 and a glide shoe 24 have been fitted, which operate in a way similar to that described in relation to FIG. 1. In this exemplifying embodiment shown in FIG. 3, the hose 22 and the glide shoe 24 have been shaped so that the effective width of the hose 22 remains invariable irrespective of any bending of the frame beam 21. In principle, the hose 22 is U-shaped, and onto the glide shoe 24, in the longitudinal direction, recesses 29 have been made for the U-projections 31 of the hose 22. To the axle journals of the frame beam 21 of the roll 20, a mantle 23 has been fixed by means of bearings, which mantle revolves and, in a situation of loading, is supported on the glide shoe 24, and in the other respects the exemplifying embodiment shown in FIG. 3 is similar to the exemplifying embodiment illustrated in FIGS. 1 and 2. The hose 12,22 may consist of two or more layers in view of minimizing any variations in the effective width, and/or the hose may have been divided into two parts in the longitudinal direction in view of controlling an oblique loading.

In accordance with the invention, the roll 10,20 may include arrangements for regulation of the pressure in the hose 12,22, or the fluid volume of the hose 12,22 has been set as desired before it is fitted in its place. Preferably, in the unloaded state, the pressure of a fluid-filled hose 12,22 is close to zero. The material and the size of the hose 12,22 are chosen on the basis of the purpose of use, situations of loading, size of the roll 10,20, etc.

The rolls 10,20 in accordance with the invention can be lubricated either hydrodynamically or hydrostatically, and the lubricants can be pumped, for example, through bores that have been made into the glide shoe 14 into pockets that have been made onto the glide shoe 14,24 in a way in itself known to a person skilled in the art.

Above, the invention has been described with reference to some preferred exemplifying embodiments of same only, the invention being by no means intended to be strictly confined to the details of said embodiments. Many variations and modifications are possible within the scope of the inventive idea defined in the following patent claims.

What is claimed is:

1. A roll, comprising
   an elongate frame beam,
   an axle journal arranged at each end of said frame beam,
   a tubular roll mantle,
   bearings for revolvingly mounting said roll mantle on said axle journals,
   a glide shoe arranged on said frame beam to produce a loading pressure against said roll mantle, and at least one fluid-retaining hose arranged between said glide shoe and said frame beam.

2. The roll of claim 1, wherein said glide shoe is substantially coextensive with said frame beam and said at least one hose is substantially coextensive with said glide shoe such that loading pressure transferred through said glide shoe to said at least one hose is substantially uniform across an axial length of the roll.

3. The roll of claim 1, wherein said frame beam comprises a recess defined by side walls, said at least one hose being arranged entirely in said recess, said glide shoe being arranged at least partially in said recess such that said at least one hose and said glide shoe are fixed in position in a longitudinal and transverse direction.

4. The roll of claim 1, wherein said at least one hose has an upwardly oriented U-shape in a cross-direction of the roll and said glide shoe has a corresponding lower surface opposite said at least one hose.

5. A method for equalizing loading pressure of a glide shoe in a longitudinal direction of a roll, the roll including an elongate frame beam on which the glide shoe is arranged, an axle journal arranged at each end of the frame beam, a roll mantle and bearings for revolvingly mounting the roll mantle on the bearings, the method comprising the step of:

arranging at least one fluid-retaining hose between the frame beam and the glide shoe such that when the roll mantle is pressed against the glide shoe, a loading force is transferred to the at least one hose and a substantially linear pressure profile across the axial length of the roll is obtained.

6. The method of claim 5, further comprising the step of:

compensating for variations in an effective width of the at least one hose by curving the frame beam.

7. The method of claim 5, further comprising the step of:

regulating pressure of the fluid in the at lest one hose.

8. The method of claim 5, further comprising the step of:

providing a set volume of the fluid in the at least one hose.

* * * * *